US011213995B2

(12) United States Patent
Ogale

(10) Patent No.: US 11,213,995 B2
(45) Date of Patent: Jan. 4, 2022

(54) COMPOSITE STRUCTURES CONSTRUCTED OF WOUND TUBULAR BRAIDING

(71) Applicant: The Boeing Company, Chicago, IL (US)

(72) Inventor: Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 16/179,343

(22) Filed: Nov. 2, 2018

(65) Prior Publication Data

US 2020/0139644 A1 May 7, 2020

(51) Int. Cl.
| | |
|---|---|
| *B29C 53/56* | (2006.01) |
| *D04C 3/48* | (2006.01) |
| *B29C 70/34* | (2006.01) |
| *B29C 70/44* | (2006.01) |
| *B29C 53/60* | (2006.01) |
| *B29C 53/82* | (2006.01) |
| *B29C 53/84* | (2006.01) |
| *B29C 53/00* | (2006.01) |
| *B29C 70/22* | (2006.01) |
| *D04C 3/40* | (2006.01) |
| *D04C 3/24* | (2006.01) |

(52) U.S. Cl.
CPC .......... *B29C 53/566* (2013.01); *B29C 53/005* (2013.01); *B29C 53/60* (2013.01); *B29C 53/824* (2013.01); *B29C 53/84* (2013.01); *B29C 70/222* (2013.01); *B29C 70/347* (2013.01); *B29C 70/443* (2013.01); *D04C 3/24* (2013.01); *D04C 3/40* (2013.01); *D04C 3/48* (2013.01)

(58) Field of Classification Search
CPC .... D04C 3/24; D04C 3/48; D04C 3/40; B29C 53/566; B29C 53/60; B29C 70/222
See application file for complete search history.

(56) References Cited

U.S. PATENT DOCUMENTS

| | | | | |
|---|---|---|---|---|
| 1,997,211 | A * | 4/1935 | Ford | D04C 3/42 87/15 |
| 2,232,524 | A * | 2/1941 | Hackbarth | D04C 3/48 87/6 |
| 2,815,043 | A | 12/1957 | Kleiner et al. | |
| 4,208,019 | A | 6/1980 | Dusenbery | |
| 4,344,582 | A * | 8/1982 | Rapp | B65H 54/026 242/413 |

(Continued)

FOREIGN PATENT DOCUMENTS

| | | |
|---|---|---|
| DE | 102014004994 B3 | 7/2015 |
| EP | 21793 A1 | 1/1981 |

(Continued)

OTHER PUBLICATIONS

NL, Search Report; NL Patent Application 2022171, 5 pages (dated Aug. 21, 2019).

(Continued)

*Primary Examiner* — Shaun R Hurley
(74) *Attorney, Agent, or Firm* — Vivacqua Crane PLLC

(57) ABSTRACT

A system for constructing a composite structure includes a braiding machine, a winding tool and a forming machine. The composite structure is constructed of a wound tubular braiding. The wound tubular braiding is constructed of a biaxial or triaxial tubular braid of unidirectional tape.

28 Claims, 14 Drawing Sheets

(56) References Cited

U.S. PATENT DOCUMENTS

| | | | |
|---|---|---|---|
| RE31,197 E | 4/1983 | Cocco | |
| 4,389,269 A | 6/1983 | Cooper et al. | |
| 4,846,908 A | 7/1989 | Aldrich et al. | |
| 4,891,179 A * | 1/1990 | Peacock | B29C 70/446 264/565 |
| 5,176,868 A | 1/1993 | Davis | |
| 5,217,770 A * | 6/1993 | Morris, Jr. | C04B 35/80 156/148 |
| 5,266,137 A * | 11/1993 | Hollingsworth | B29C 53/824 156/156 |
| 5,580,627 A * | 12/1996 | Goodwin | B29C 70/228 428/36.3 |
| 6,160,761 A * | 12/2000 | Sansone | G01H 9/004 156/156 |
| 6,631,666 B2 * | 10/2003 | Cahuzac | D04C 3/12 87/16 |
| 7,770,837 B1 | 8/2010 | Head et al. | |
| 9,174,393 B2 * | 11/2015 | Bartel | B29C 70/205 |
| 9,435,060 B2 * | 9/2016 | Woods | B29C 53/58 |
| 10,364,001 B1 | 7/2019 | Head et al. | |
| 2011/0005371 A1 * | 1/2011 | Giebels | D04C 3/48 87/11 |
| 2012/0312848 A1 | 12/2012 | Delusky et al. | |
| 2014/0102578 A1 | 4/2014 | Bartel et al. | |
| 2014/0117166 A1 * | 5/2014 | Campbell, Jr. | B64C 23/069 244/199.4 |
| 2014/0370206 A1 | 12/2014 | Head et al. | |
| 2014/0377490 A1 | 12/2014 | Fraidenburg | |
| 2015/0217508 A1 * | 8/2015 | Rossi | B29C 33/448 428/80 |
| 2016/0178108 A1 | 6/2016 | Ehsani | |
| 2016/0194459 A1 | 7/2016 | Kozar et al. | |
| 2016/0201478 A1 * | 7/2016 | Kray | F01D 5/282 415/200 |
| 2016/0289873 A1 | 10/2016 | Head | |
| 2017/0066209 A1 | 3/2017 | Hyson | |
| 2017/0190137 A1 * | 7/2017 | Marcoe | B32B 5/024 |
| 2018/0281711 A1 | 10/2018 | Khan et al. | |
| 2019/0226401 A1 | 7/2019 | Heeter et al. | |

FOREIGN PATENT DOCUMENTS

| | | |
|---|---|---|
| EP | 528336 A2 | 2/1993 |
| EP | 1342553 A1 | 9/2003 |
| FR | 2874852 A1 | 3/2006 |
| JP | 02112926 A | 4/1990 |
| WO | 02072337 A1 | 9/2002 |

OTHER PUBLICATIONS

NL, Search Report; NL Patent Application 2022288, 5 pages (dated Aug. 21, 2019).

NL, Search Report; NL Patent Application 2022289, 4 pages (dated Aug. 19, 2019).

* cited by examiner

COMPOSITE STRUCTURES CONSTRUCTED OF WOUND TUBULAR BRAIDING

INTRODUCTION

The present disclosure relates to composites structures. More specifically, the present disclosure relates to a composite structure constructed of wound tubular braiding.

BACKGROUND

An increasing number of composite materials are being used on aircraft. Composite materials typically include reinforcing fibers bound to a polymer resin matrix. The fibers may be unidirectional. Alternatively, the fibers may take the form of a woven cloth or fabric. The fibers and polymer resin are arranged and cured to form a composite structure. Some examples of composite materials that may be used in an aircraft include aircraft windows and door frames.

There are various challenges that exist when fabricating composite structures using conventional processes. For example, circular or elliptical composite components may require specific lay-up schemes to create lay-ups. The lay-up schemes are often controlled by the limitation of existing processes. Examples of these existing processes include fiber placement or fabric making machines. However, fiber placement or fabric making machines are typically tailored specifically for a particular configuration or final structure of the finished product. Current processes based on automated fiber placement or woven fabric are costly, time consuming, and may not be advantageous for components having tight radii.

Some composite components require a hole or aperture defined within the structure. For example, aircraft window frames define an aperture. It may be especially difficult and laborious to orient the reinforcing fibers for a composite component having an aperture. Additionally, when conventional manufacturing processes are used to fabricate a composite component having an aperture, relatively large amounts of material waste may be produced.

Thus, while current methods and systems for fabricating composite structures achieve their intended purpose, there is a need for anew and improved system and method of fabricating composite structures.

SUMMARY

According to several aspects, a composite structure is disclosed. The composite structure includes a formed winding of tubular braiding.

In another aspect of the present disclosure, a composite structure including a biaxial braiding that is formed into a winding is disclosed.

According to several aspects, a composite structure including a tubular braiding that is biaxially braided is disclosed.

In another aspect of the present disclosure, a composite laminate structure including a plurality of plies is disclosed. The composite structure includes biaxially braided fibers oriented in the same direction for each of the plurality of plies.

In yet another aspect of the present disclosure, a braiding machine is disclosed and includes a mandrel, a braiding mechanism having spools each moveable relative to the mandrel, a unidirectional tape wound around each of the spools, a guide ring, and a control module. The guide ring directs the unidirectional tape wound around a corresponding spool onto the mandrel. The control module is in electronic communication with the braiding mechanism. The control module executes instructions to guide movement of the plurality of spools to place the unidirectional tape onto the mandrel to create a tubular braiding.

In still another aspect of the present disclosure, an apparatus for fabricating a composite structure of wound tubular braiding is disclosed. The apparatus includes a tool defining an outer surface, a device to wind the tubular braiding around the outer surface of the tool to create a composite preform, a forming device to consolidate the composite preform, and a control module. The control module is in electronic communication with the device and the forming device. The control module executes instructions to guide the device to wind the tubular braiding around the outer surface of the tool and operate the forming device to consolidate the composite preform.

According to several aspects, a method of forming a composite structure is disclosed. The method includes forming a wound tubular braiding into the composite structure.

In still another aspect of the disclosure, a method of fabricating a composite preform is disclosed. The method includes winding a tubular braiding of unidirectional fibers while allowing the unidirectional fibers shift to relative to one another without bending.

In another aspect of the disclosure, a method of forming a tubular braiding is disclosed. The method includes braiding unidirectional tape into the tubular braiding.

In another aspect of the disclosure, a wound tubular braiding for a composite structure is disclosed. The wound tubular braiding includes a tubular braiding wound into a helical shape.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

A composite structure constructed of a formed winding of tubular braiding is disclosed. The tubular braiding is constructed of a unidirectional tape or a unidirectional tow of unidirectional fibers. A braiding machine for fabricating the tubular braid is also disclosed. The braiding machine includes a braiding mechanism and a mandrel. A plurality of spools having unidirectional tape or unidirectional tow wound around each spool are mounted to the braiding mechanism. The braiding mechanism controls placement of the unidirectional tape or unidirectional tow from the spools and onto the mandrel to create the tubular braiding. The tubular braiding may have a biaxial braid or a triaxial braid.

An apparatus for fabricating the composite structure by winding the tubular braiding around a tool is also disclosed. In one embodiment, the braiding is first removed from the mandrel and wound around an outer surface of the tool to create a wound tubular braiding. In another embodiment, the mandrel remains with, and forms part of, the wound tubular braiding. In yet another embodiment, the tubular braiding is slit to remove the mandrel. The unidirectional tape or unidirectional tow are not constricted as the tubular braiding is wound around the tool. In other words, the unidirectional tape or unidirectional tow slips or shears relative to one another as the tubular braiding is wound around the tool. This relative slippage or shearing of the unidirectional tape or unidirectional tow permits the construction of structures without wrinkling yet having fiber direction orientated advantageously relative to the final structure. The wound tubular braiding is then removed from the tool and is heated and compacted flat by a forming machine to create the composite structure. Once again, the unidirectional tape or unidirectional tow are not constricted and slip or shear relative to one another as the tubular braiding is compacted flat.

Allowing the unidirectional fibers to slip or shear relative to one another during winding and consolidating the composite preform results in a composite structure having more fibers orientated advantageously relative to the structure per ply of laminate being created. Moreover, the resulting composite structure also requires fewer plies of laminate to achieve strength goals since more fibers are orientated advantageously relative to structure per ply of laminate makes the structure more efficient This in turn results in weight reduction of the component. The disclosed process of creating the composite structure is rapid when compared to conventional lay-up processes, which in turn enables higher production rates. Furthermore, the disclosed process for creating the composite also results in reduced waste and labor intensive post-processing machining when compared to conventional processes.

The following description is merely exemplary in nature and is not intended to limit the present disclosure, application, or uses.

Figure 1:
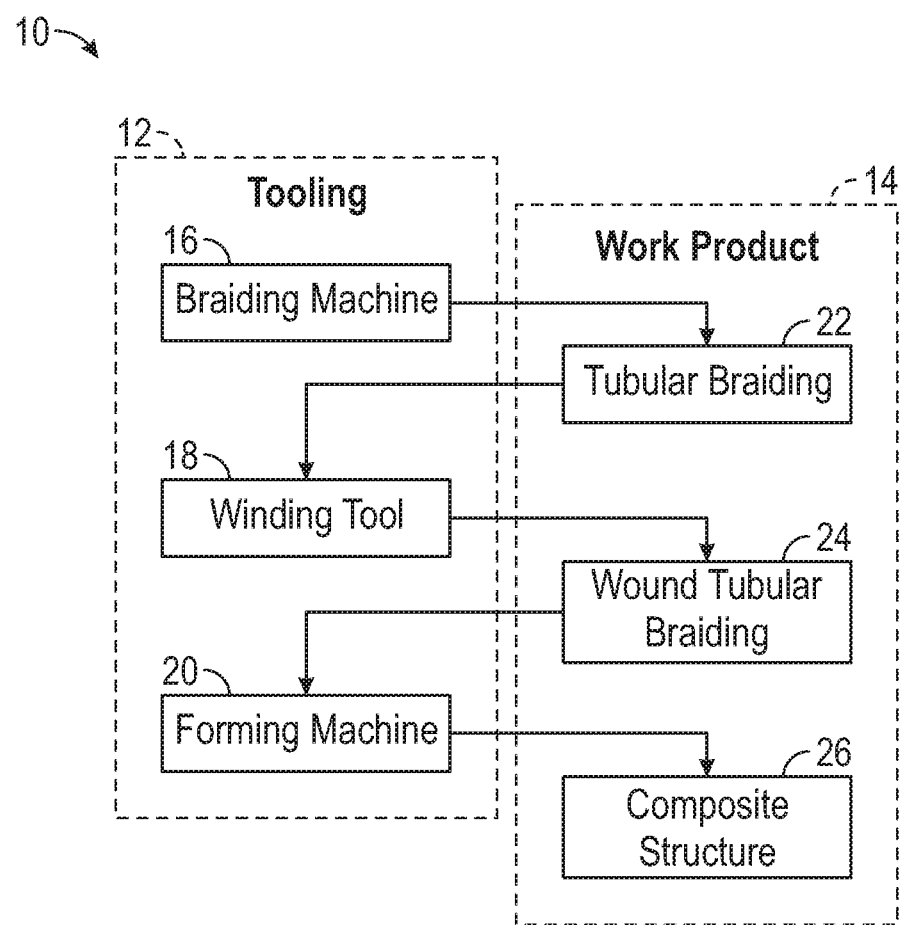
FIG. 1 is a schematic diagram of a system for constructing composite structures, according to an exemplary embodiment.

Referring to FIG. 1, a schematic diagram of a system 10 for constructing composite structures is shown. The system 10 generally includes tooling 12 and work product 14 upon which the tooling 12 interacts. The tooling 12 includes a braiding machine 16, a winding tool 18, and a forming machine 20. The work product 14 includes a tubular braiding 22, a wound tubular braiding 24, and a composite structure 26. The wound tubular braiding 24 may also be referred to as a winding of tubular braiding. The tubular braiding 22 is formed by the braiding machine 16. The wound tubular braiding 24 is formed by the winding tool 18 from the tubular braiding 22. The composite structure 26 is formed by the forming machine 20 from the wound tubular braiding 24. The composite structure 26 is any frame that surrounds and provides support to an aperture that requires a specific fiber orientation and lay up to meet design requirements. For example, the composite structure 26 may be a window frame for an aircraft, a door frame for an aircraft, etc. The tooling 12 may include other machines, such as molding or post-processing machines, cutting devices, etc., without departing from the scope of the present disclosure. Likewise, the work product 14 may include additional variations of the tubular braiding 22, wound tubular braiding 24, and composite structure 26. The system 10 may be employed in the context of aircraft manufacturing and service, as will be described below. For example, the system 10 may be used in component and subassembly manufacturing of an aircraft including an airframe and interior, system integration of the aircraft, and routine maintenance and service of the aircraft.

Figure 2:
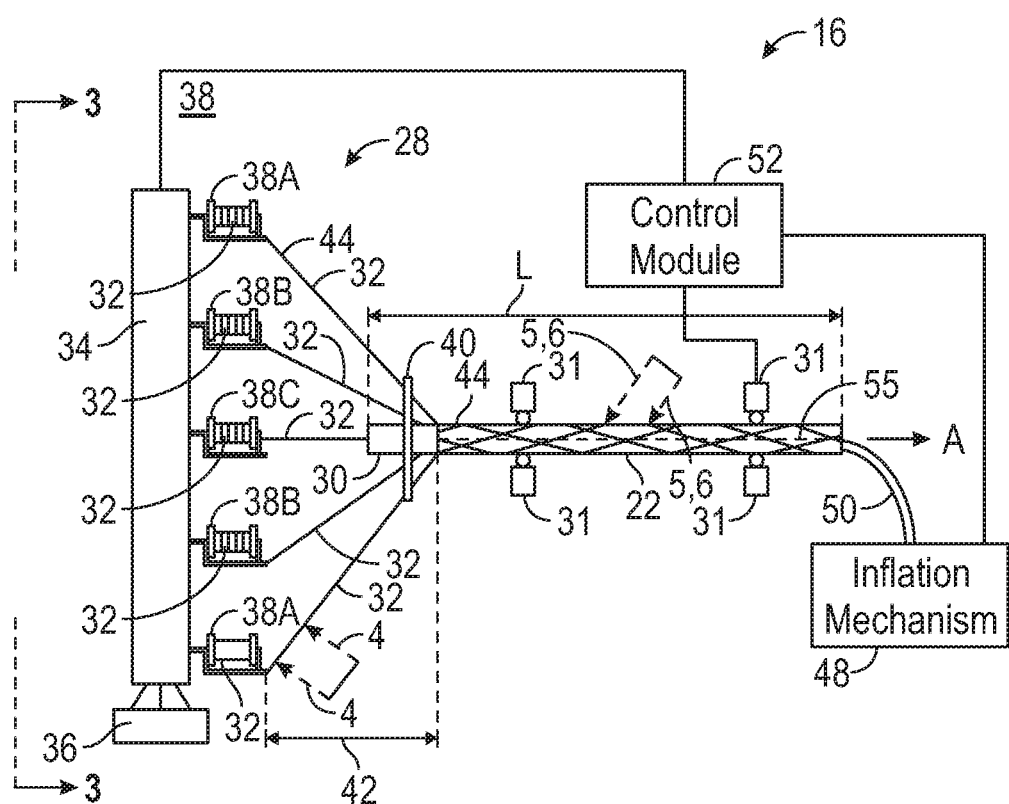
FIG. 2 is a schematic diagram of a braiding machine for fabricating a tubular braiding according to an exemplary embodiment.

With reference to FIG. 2, a schematic side view of the braiding machine 16 is illustrated. The braiding machine 16 includes a braiding mechanism 28 and a mandrel 30. The braiding mechanism 28 is configured to braid a unidirectional tape 32 or unidirectional tow onto the mandrel 30, as will be described below. The mandrel 30 is supported and advanced by a holder 31 along a center axis "A" of the braiding mechanism 28.

Figure 3:
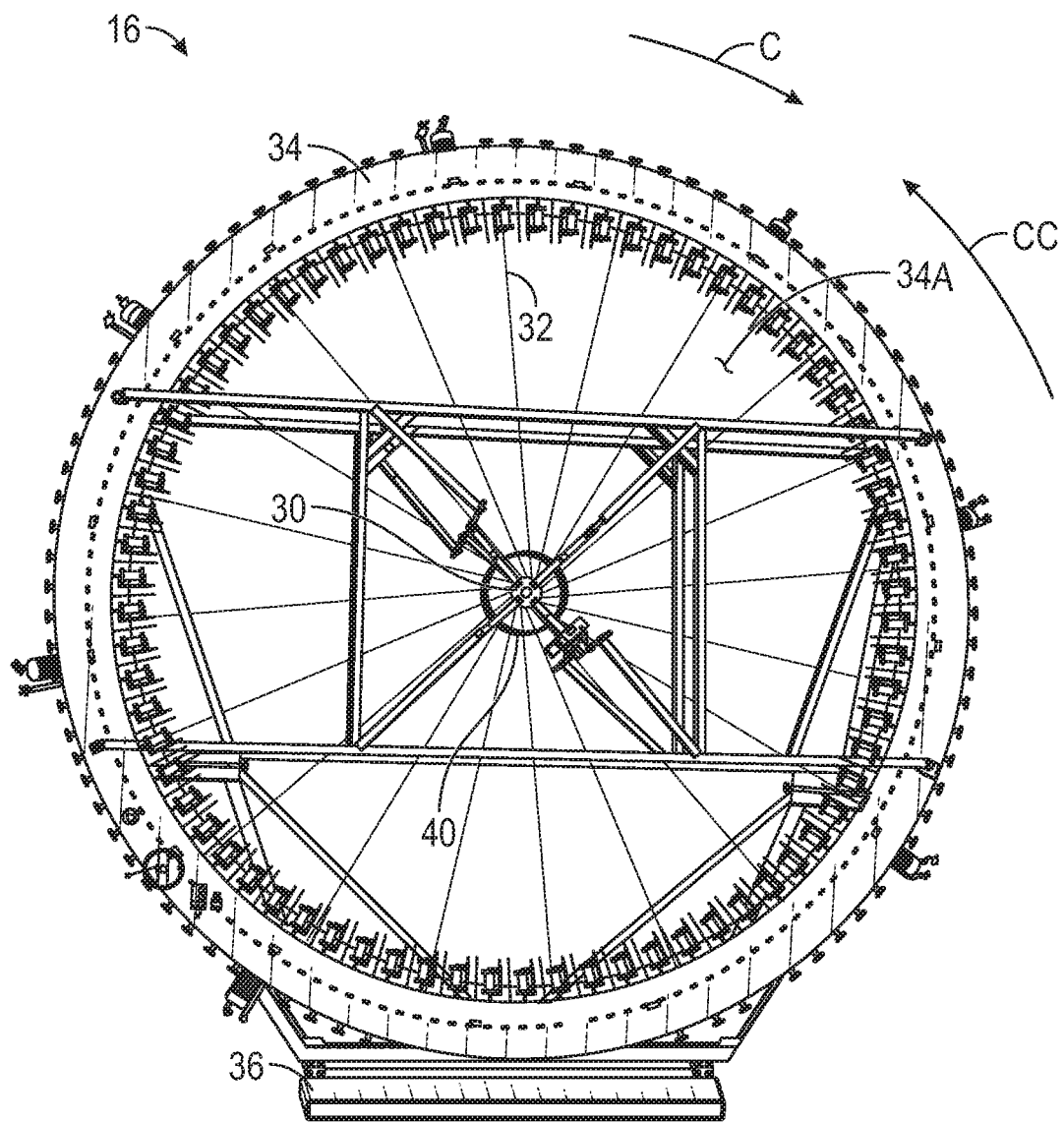
FIG. 3 is the braiding machine shown in FIG. 2 viewed in the direction of section line 3-3, according to an exemplary embodiment.

With reference to FIG. 3 and continued reference to FIG. 2, an illustration of the braiding machine 16 viewed in the direction of section line 3-3 in FIG. 2 is shown. The braiding mechanism 28 includes a carrier 34 supported by a base plate 36. The carrier 34 is ring-shaped and defines an aperture 34A. The mandrel 30 passes through the aperture 34A during braiding along center axis "A". A number of spools 38 are mounted to the carrier 34. The spools 38 are each moveable relative to the mandrel 30 annularly about the center axis of the carrier 34. The unidirectional tape 32 is wound around each of the spools 38. While in FIG. 2 five spools 38 are schematically shown and in FIG. 3 numerous spools 38 are illustrated, it should be appreciated that any number of spools 38 may be used depending on the desired properties of the tubular braiding 22. For example, in one non-limiting embodiment the braiding mechanism 28 includes as few as forty spools 38 or as many as two hundred spools 38. The spools 38 generally include warp spools 38A and weft spools 38B. The warp spools 38A are moved in a clockwise direction C (shown in FIG. 3) by the carrier 34 and the weft spools 38B in a counter-clockwise direction CC (shown in FIG. 3) by the carrier 34. The warp spools 38A and the weft spools 38B are preferably moved at the same speed.

The braiding mechanism 28 further includes a guide ring 40 positioned around the mandrel 30. The guide ring 40 directs the unidirectional tape 32 wound around a corresponding spool 38 onto the mandrel 30. Specifically, the unidirectional tape 32 is directed from a corresponding spool 38 onto the mandrel 30 through a convergence zone 42. The point where the unidirectional tape 32 first comes into contact with the mandrel 30 is denoted as a fell point 44.

The mandrel 30 acts as a substrate on which the unidirectional tape 32 is braided by the braiding mechanism 28 to form the tubular braiding 22. The mandrel 30 may have various shapes but is preferably an elongated cylinder. In one embodiment, the diameter of the mandrel 30 is 2 inches. However, it should be appreciated that the mandrel 30 may have other diameters depending on the design requirements of the composite structure 26. In one embodiment, the size or volume of the mandrel 30 may be controlled. For example, the mandrel 30 is an inflatable tube, such as a silicon bladder. However, in another embodiment, the mandrel 30 has a fixed size or volume. For example, the mandrel 30 is constructed of a solid semi-rigid material such as, but not limited to, ethylene propylene diene monomer (EPDM), rubber, silicone, neoprene, or natural rubber. In yet another embodiment, the mandrel 30 is constructed of a thin film polymer compatible with the composition of the unidirectional tape 32.

An inflation mechanism 48 is connected to the mandrel 30 by a supply line 50. The inflation mechanism 48 provides pressurized air or another gas or liquid to the mandrel 30. The inflation mechanism 48 cycles the mandrel 30 between a deflated state and an inflated state.

Figure 4:
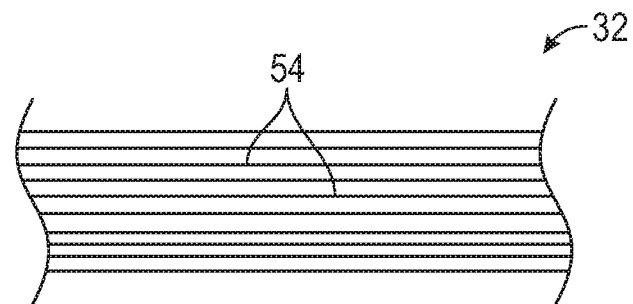
FIG. 4 is an enlarged view of a unidirectional tape, indicated by section line 4-4 in FIG. 3, according to an exemplary embodiment.

Turning briefly to FIG. 4, an enlarged view of the unidirectional tape 32, indicated by Section view 4-4 in FIG. 2, is shown. The unidirectional tape 32 comprises unidirectional fibers 54 in a continuous strip held together by thermal or adhesive bonding. The unidirectional fibers 54 are parallel with one another. In one embodiment, the unidirectional fibers 54 are pre-impregnated with a resin. In one embodiment, the resin is a thermoplastic such as, for example polyphenylene sulfide (PPS), polyether ether ketone (PEEK), polyether ketone ketone (PEKK), etc. However, in another embodiment, the resin is a thermoset resin such as, for example, epoxy, cyanate ester, etc. In still another embodiment, the unidirectional fibers 54 are held together by relatively fine holding threads (not shown). The holding threads are not woven with the unidirectional fibers 54. Instead, the holding threads are deposited on the top and bottom sides of the unidirectional tape 32. In another embodiment, the unidirectional tape 32 is comprised of a unidirectional tow. A unidirectional tow includes unidirectional fibers that are held together by stitching threads crossing over several carbon tows. In still other embodiments, the unidirectional tape 32 is constructed of a slit-tape thermoplastic, a thermoset tape that is substantially tack-free at room temperature, a bindered dray roving prepreg wherein an epoxy or thermoplastic binder is applied, a substantially tack-free thermoset prepreg, or a low tack thermoset prepreg.

Returning to FIGS. 2 and 3, the operation of the braiding machine 16 is controlled by a control module 52 (shown in FIG. 2). The control module 52 is in communication with the braiding mechanism 28, the holder 31, and the inflation mechanism 48. The control module 52 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the control module 52 may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The control module 52 controls movement of the mandrel 30 via the holder 31 and movement of the spools 38 to braid the unidirectional tape 32 onto the mandrel 30 to form the tubular braiding 22. For example, the control module 52 executes instructions to inflate the mandrel 30 to the inflated state by commanding the inflation mechanism 48 to provide pressurized air to the mandrel 30. The control module 52 executes instructions to guide movement of the mandrel 30 in an axial direction 'A' (shown in FIG. 2) through the carrier 34. As the mandrel 30 moves through the carrier 34, the control module 52 executes instructions to move the warp spools 38A in the clockwise C direction and the weft spools 38B in the counter clockwise CC direction around the mandrel 30. The unidirectional tape 32 is pulled from a corresponding spool 38. The unidirectional tape 32 from the warp spools 38A and the weft spools 38B interlock or weave together with one another to create the tubular braiding 22 on the mandrel 30. In one embodiment, the control module 52 receives an indication that the unidirectional tape 32 is wound around the mandrel 30. Specifically, the indication means that the braiding machine 16 has finished placing the unidirectional tape 32 onto the mandrel 30 to create the tubular braiding 22. For example, the indication may be a manual input from a user. Alternatively, a sensor may provide an indication that the braiding machine 16 has finished creating the tubular braiding 22. In response to receiving the indication, the control module 52 instructs the inflation mechanism 48 to release air to deflate the mandrel 30.

In the embodiment where the mandrel 30 is not inflatable, the tubular braiding 22 is slit to remove the mandrel 30. For example, a cutting machine (not shown) or worker may be used to slit the tubular braiding 22 along an entire length thereof, thus allowing the mandrel 30 to be removed. An example of a slit 55 is shown by dashed line in FIG. 2. Alternatively, where the mandrel 30 is comprised of the thin film polymer compatible with the composition of the unidirectional tape 32, the mandrel 30 remains with, and forms part of, the tubular braiding 22.

In an alternative embodiment, the control module 52 executes instructions to provide air via the inflation mechanism 48 to inflate the mandrel 30 only partially. Once the control module 52 receives an indication that the unidirectional tape 32 is wound around the mandrel 30, the control module 52 then executes instructions to provide air by the inflation mechanism 48 to further inflate the mandrel 30, which in turn places the unidirectional fibers 54 into tension. Alternatively, the mandrel 30 may remain partially inflated during the braiding. Fully inflating the mandrel 30 allows for near-zero fiber angle lay-up and avoids any collapse or volume shrinkage of the mandrel 30 where the braid of unidirectional tape 32 is tight. Partially inflating the mandrel 30 to a point where the mandrel is geometrically stable allows for a relatively flexible or loose braid of unidirectional tape 32. This, in turn, allows the unidirectional tape 32 to slip or shear during winding and forming, as described below. In both cases, controlling the size or volume of the mandrel 30 provides the ability to customize a geometry of the tubular braiding 22 that is braided onto the mandrel 30.

Figure 5:
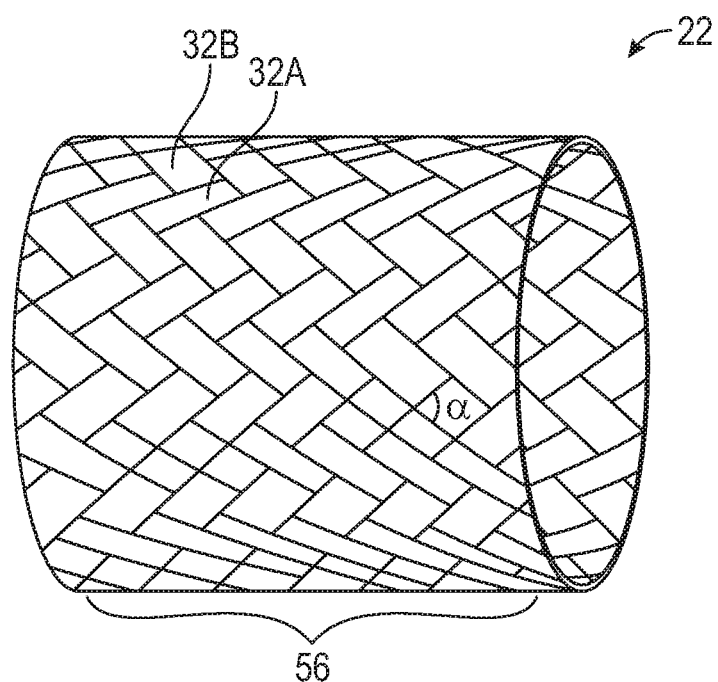
FIG. 5 is a perspective view of a portion of a tubular braiding having a biaxial braid fabricated by the braiding machine shown in FIGS. 2 and 3 according to an exemplary embodiment.

FIG. 5 shows an enlarged portion of the tubular braiding 22 viewed in the direction of arrows 5-5 in FIG. 2. In the example provided, the tubular braiding 22 includes a biaxial braid 56. In the biaxial braid 56, a matrix of parallel unidirectional tape 32A are interwoven or braided into an matrix of orthogonal parallel unidirectional tape 32B. The parallel unidirectional tape 32A is disposed at a bias angle α to the orthogonal parallel unidirectional tape 32B. The bias angle α is determined based on the specific application, however steeper braid angles result in increased flexibility. However, angle α may change when the unidirectional tape is wound or formed, as described below.

Returning back to FIG. 2, the braiding machine 16 may also be configured to form a tubular braiding 22 having a triaxial braid. To form a tubular braiding 22 with a triaxial braid, the unidirectional tape 32 is inserted along a length "L" of the mandrel 30 from fixed spools 32C (only one of which is shown). The fixed spools 32C do not rotate along the frame 34. It should be appreciated that any number of fixed spools 32C may be employed.

Figure 6:
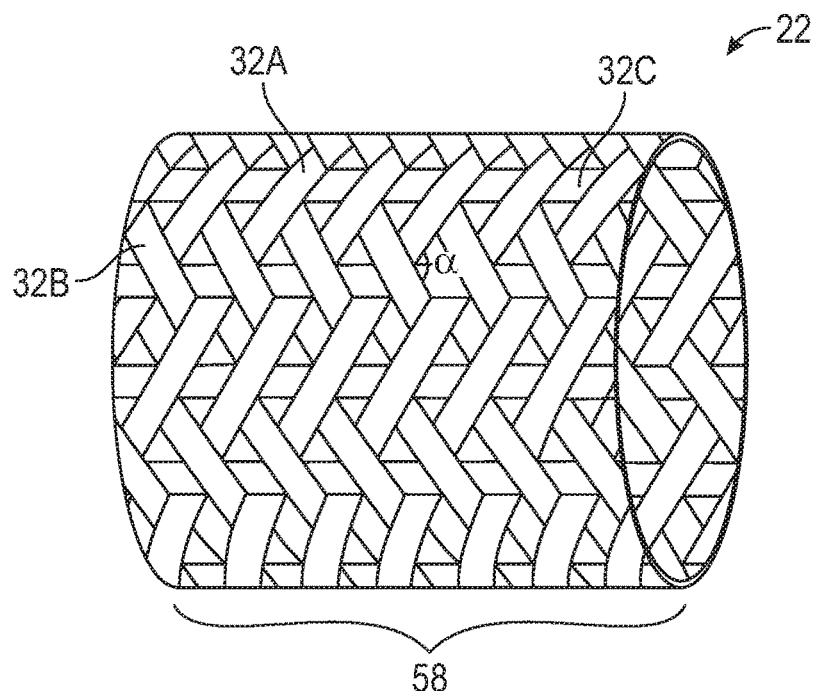
FIG. 6 is a perspective view of a portion of a tubular braiding having a triaxial braid fabricated by the braiding machine shown in FIGS. 2 and 3 according to an exemplary embodiment.

FIG. 6 shows an enlarged portion of the tubular braiding 22 with a triaxial braid 58 viewed in the direction of arrows 6-6 in FIG. 2. The triaxial braid 58 is similar to the biaxial braid 56 (FIG. 5), however, an additional matrix of parallel unidirectional tape 32C, extending the axial length of the tubular braiding 22 parallel to the center axis "A" (FIG. 2), is interwoven into the parallel unidirectional tape 32A and orthogonal parallel unidirectional tape 32B. The unidirectional tape 32C is supplied from the fixed spools 32C. Again, the bias angle α may change when the unidirectional tape is wound or formed, as described below. The triaxial braid 58 may provide enhanced structural strength in the longitudinal direction of the tubular braiding 22.

Figure 7:
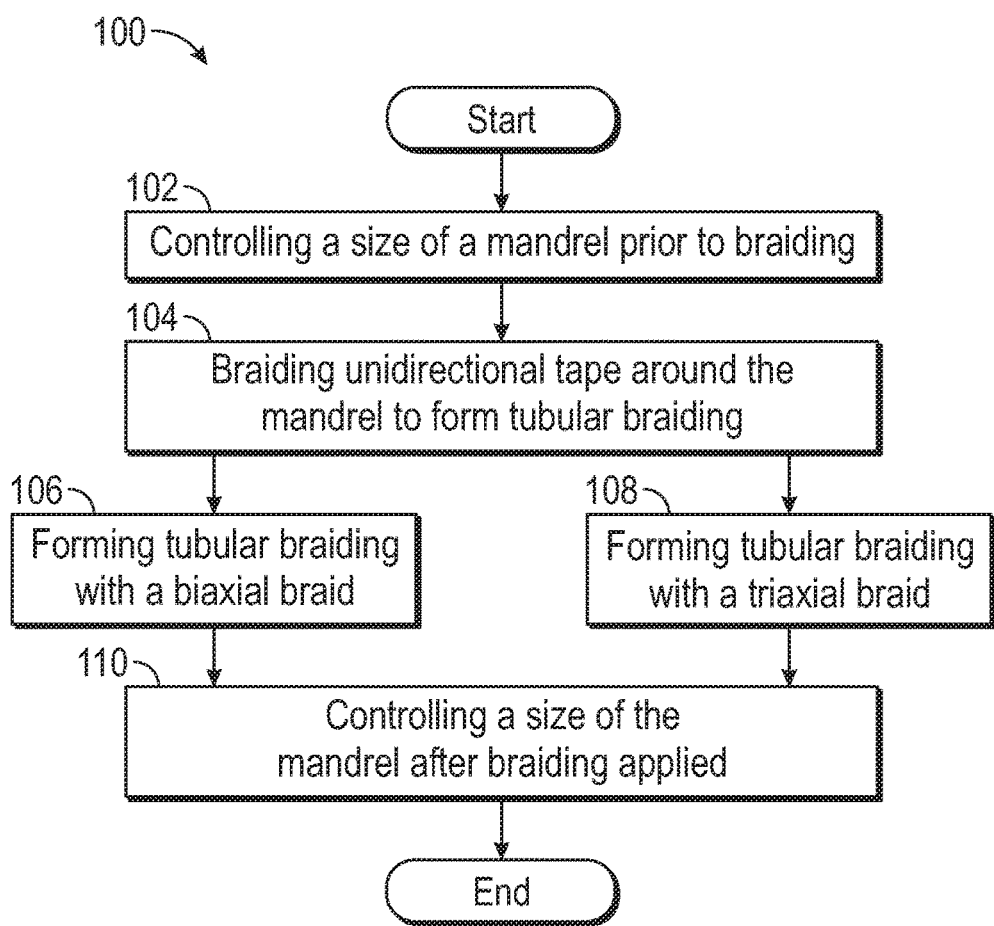
FIG. 7 is an exemplary process flow diagram illustrating a method of forming the tubular braiding using an inflatable mandrel, according to an exemplary embodiment.

With reference to FIG. 7, and continued reference to FIGS. 2-6, a flow diagram is shown illustrating a method 100 of forming the tubular braiding 22 where a size or volume of the mandrel 30 is controlled. The method 100 begins at block 102. In block 102, the control module 52 controls the size or volume of the mandrel 30 prior to braiding. In one example, the mandrel 30 is inflatable by the inflation mechanism 48. Thus, the control module 52 instructs the inflation mechanism 48 to provide air to inflate the mandrel 30. In one embodiment, the mandrel 30 is inflated fully. In another embodiment, the mandrel 30 is partially inflated. The method 100 then proceeds to block 104.

In block 104, the method 100 includes braiding the unidirectional tape 32 around the mandrel 30 to form the tubular braiding 22. For example, the control module 52 commands the mandrel 30 to move axially in the direction "A" while commanding the spools 38 to rotate, thus forming a braid of unidirectional tape 32 on the mandrel 30, as described above. Depending on the configuration of the braiding mechanism 28, one of a biaxial braid 56 (FIG. 5) or a triaxial braid 58 (FIG. 6) is formed on the mandrel 30 and the method 100 proceeds to block 106 or block 108.

In block 106, the braiding machine 16 braids the tubular braiding 22 with the biaxial braid 56 (FIG. 5). In block 108, the braiding machine 16 braids the tubular braiding 22 with the triaxial braid 58 (FIG. 6). In either case, the method 100 proceeds to block 110.

In block 110, the control module 52 controls the size or volume of the mandrel 30 after the braiding is complete. For example, the control module 52 instructs the inflation mechanism 48 to deflate the mandrel 30, thus allowing the tubular braiding 22 to be easily removed from the mandrel 30.

Figure 8:
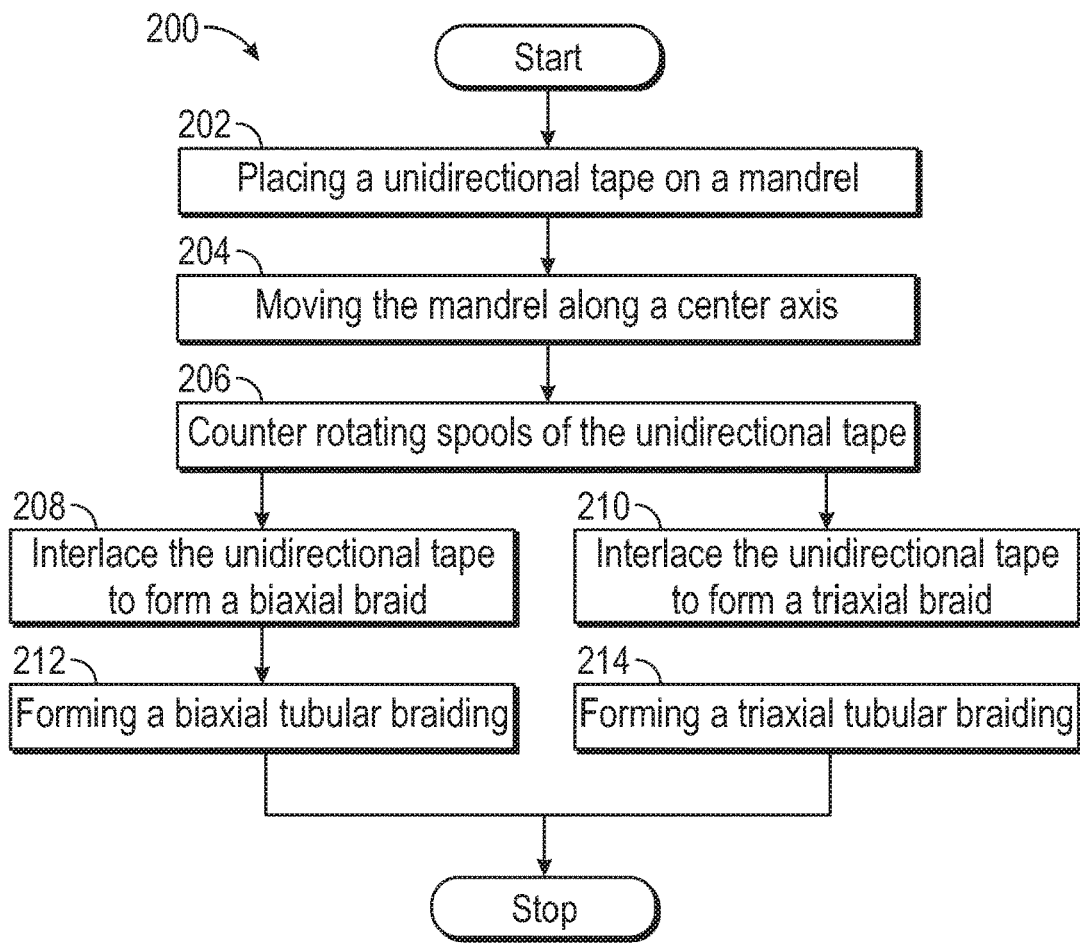
FIG. 8 is an exemplary process flow diagram illustrating a method of forming the tubular braiding using a non-inflatable mandrel, according to an exemplary embodiment.

With reference to FIG. 8, and continued reference to FIGS. 2-6, a flow diagram is shown illustrating a method 200 of forming the tubular braiding 22 where the mandrel 30 is not inflatable. The method 200 begins at block 202. In block 202, the method 200 includes placing the unidirectional tape 32 on the mandrel 30. For example, a combination of unidirectional tape 32A, 32B, or 32C may be placed on the mandrel 30. The method 200 then proceeds to block 204.

At block 204 the control module 52 commands the mandrel 30 to move axially along the center axis "A" (FIG. 2). At block 206, the control module 52 commands the warp spools 38A and the weft spools 38B to counter rotate about the center axis "A" as the mandrel 30 moves along the center axis "A". Depending on which type of braid 56, 58 (FIGS. 5, 6) is to be produced, the method 200 proceeds to either block 208 or block 210.

At block 208 the unidirectional tape 32A, 32B are interlaced together to form the biaxial braid 56 (FIG. 5). For example, as the mandrel 30 moves along the center axis "A", the warp spools 38A and the weft spools 38B counter-rotate. Movement of the mandrel 30 draws out the unidirectional tape 32 disposed on the warp spools 38A and the weft spools 38B. The counter-rotation of the warp spools 38A and the weft spools 38B interlaces the unidirectional tape 32A from the warp spools 38A with the unidirectional tape 32B from the weft spools 38B as the mandrel 30 moves along the center axis "A" (FIG. 2). At block 212 the tubular braiding 22 has been formed with a biaxial braid 56 (FIG. 5).

At block 210 the unidirectional tape 32A, 32B, and 32C are interlaced together to form the triaxial braid 58 (FIG. 6). For example, as the mandrel 30 moves along the center axis "A", the warp spools 38A and the weft spools 38B counter-rotate. Movement of the mandrel 30 draws out the unidirectional tape 32A disposed on the warp spools 38A, the unidirectional tape 32B disposed on the weft spools 32B, and the unidirectional tape 32C disposed on the fixed spools 38C. The counter-rotation of the warp spools 38A and the weft spools 38B interlaces the unidirectional tape 32A from the warp spools 38A with the unidirectional tape 32B from the weft spools 38B and with the unidirectional tape 32C from the fixed spools 38C as the mandrel 30 moves along the center axis "A" (FIG. 2). At block 214 the tubular braiding 22 has been formed with a triaxial braid 58 (FIG. 6).

In either case, the method 200 ends when the tubular braiding 22 has been formed. Where the mandrel 30 is removable, the method 200 may also include slitting the tubular braiding 22 along an entire length thereof to assist in removing the mandrel 30. Where the mandrel 30 is formed of the thin film polymer compatible with the composition of the unidirectional tape 32, the mandrel 30 remains with, and forms part of, the tubular braiding 22.

Figure 9:
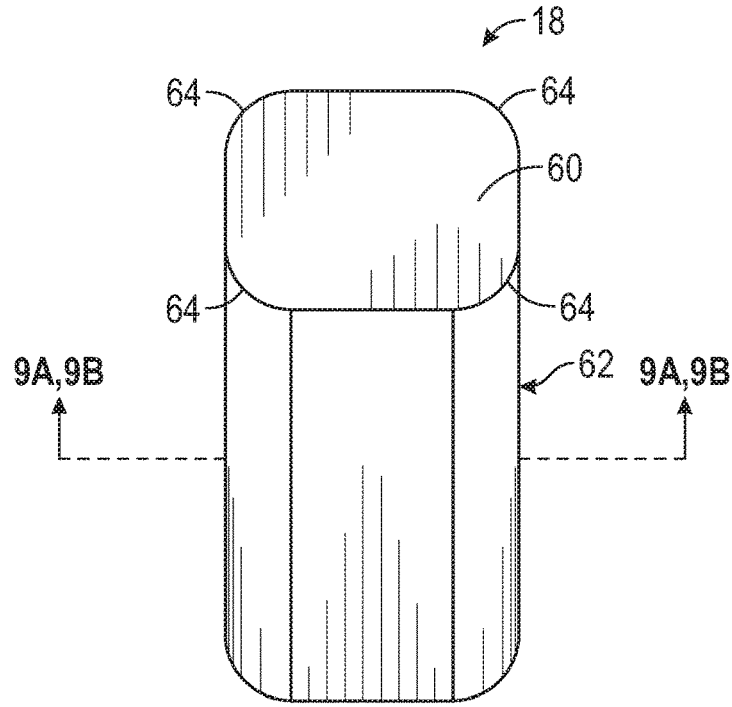
FIG. 9 is front perspective view of a winding tool, according to an exemplary embodiment.
Figure 9A:
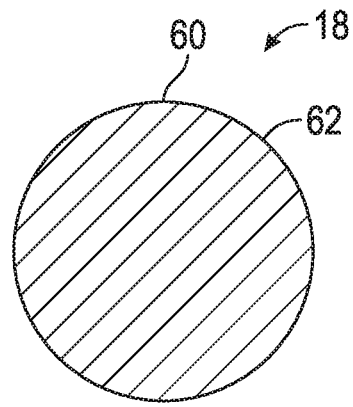
FIG. 9A is an alternate embodiment of a cross section of the winding tool viewed in the direction of section line 9A-9A in FIG. 9, according to an exemplary embodiment.
Figure 9B:
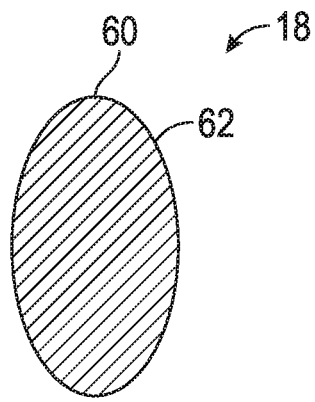
FIG. 9B is another alternate embodiment of a cross section of the winding tool viewed in the direction of section line 9B-9B in FIG. 9, according to an exemplary embodiment.

Turning to FIG. 9, the winding tool 18 will now be described. The winding tool 18 generally includes a body portion 60 that extends vertically It should be appreciated that in other embodiments the body portion 60 may extend horizontally or at an angle. The body portion 60 has an outer surface 62. The outer surface 62 generally conforms to a shape of the composite structure 26. Thus, a cross-sectional shape of the body portion 60 varies depending on the final shape of the composite structure 26. In the example provided, the body portion 60 has a rectangular cross-section with rounded corners 64. However, as shown in FIG. 9A, the body portion 60 may have a circular cross-section. Alternatively, as shown in FIG. 9B, the body portion 60 may have an elliptical or oval cross-section. It should be appreciated that the body portion 60 may have additional cross-sections without departing from the scope of the present disclosure.

Figure 10:
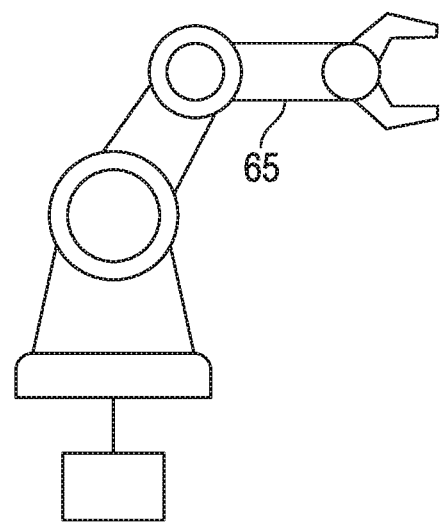
FIG. 10 is front perspective view of the winding tool with a wound tubular braiding disposed thereon, according to an exemplary embodiment.
Figure 10:
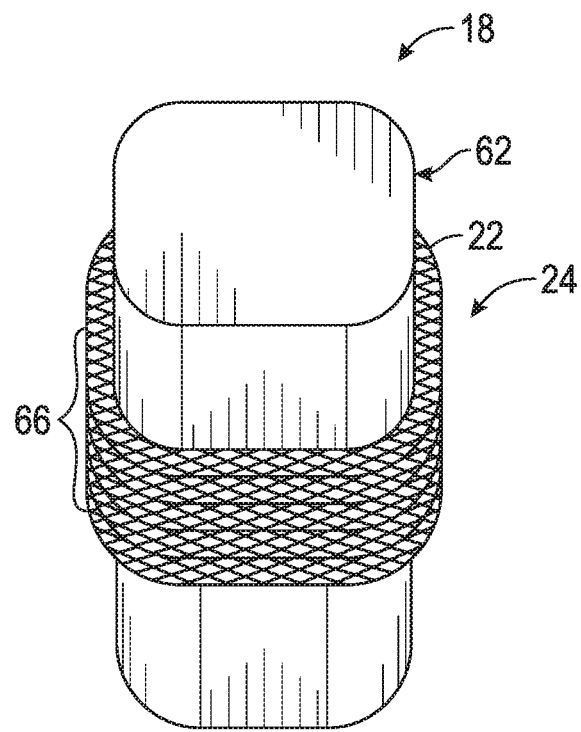

With reference to FIG. 10, to form the wound tubular braiding 24, the tubular braiding 22 is wound around the outer surface 62 of the winding tool 18. The tubular braiding 22 may be wound around the winding tool 18 manually or in an automated process using a device 65, such as a robotic arm or manipulator, etc. The wound tubular braiding 24 is comprised of stacked turns 66 of the tubular braiding 22. While in the example provided five stacked turns 66 are shown, it should be appreciated that the tubular braiding 22 may be wound around the winding tool 18 any number of times producing any number of stacked turns 66. It should be appreciated that the number of stacked turns 66 is dependent upon the number of plies desired in the composite structure 26 and the thickness of the composite structure 26. Where the tubular braiding 22 has the triaxial braid 58, the unidirectional tape 32C (FIG. 6) is orientated roughly parallel to the outer surface 62 of the winding tool 18 when the tubular braiding 22 is wound around the winding tool 18. Thus, the unidirectional tape 32C (FIG. 6) is disposed roughly parallel to an aperture and or an outer perimeter of the composite structure 26.

Figure 11:
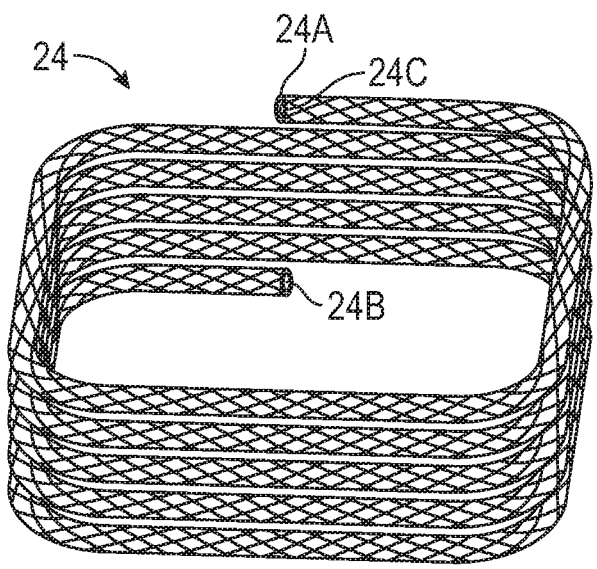
FIG. 11 is front perspective view of the wound tubular braiding, according to an exemplary embodiment.

Once the wound tubular braiding 24 is formed, the wound tubular braiding 24 is separated from the winding tool 18, as shown in FIG. 11. The wound tubular braiding 24 may be separated from the winding tool 18 manually or in an automated process using a robotic arm or manipulator (not shown), etc. The wound tubular braiding 24 has a first free end 24A and a second free end 24B. As seen in FIG. 11, the wound tubular braiding 24 has a helical or spiral shape and is formed of a single length of tubular braiding 22. The wound tubular braiding 24 is hollow and defines a central bore 24C that extends throughout the wound tubular braiding 24. When separated from the winding tool 18, the wound tubular braiding 24 has sufficient strength to maintain the overall shape that was provided by the winding tool 18. To form the composite structure 26, the wound tubular braiding 24 is placed in the forming machine 20, as will be described below.

Figure 12:
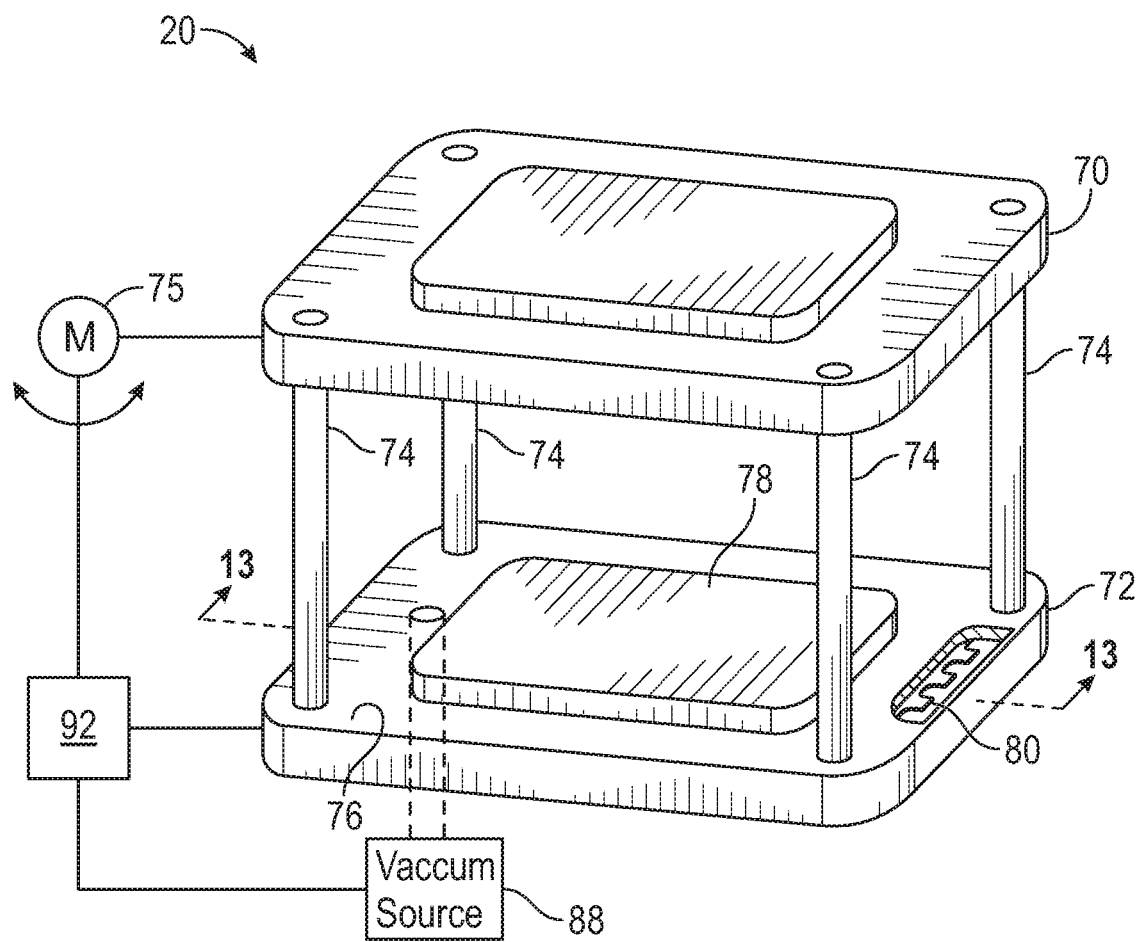
FIG. 12 is a front perspective view of a forming machine in an open position, according to an exemplary embodiment.

FIG. 12 shows a front perspective view of the forming machine 20 in an open position. The forming machine 20 includes an upper die plate 70 and a lower die plate 72. In the example provided, the upper die plate 70 may be lowered on support members 74 via an electric motor 75 to mate with the lower die plate 72 in a closed position. Alternatively, the upper die plate 70 and the lower die plate 72 may be hinged together (not shown). The lower die plate 72 includes a lower mold surface 76 and a forming mandrel 78 extending from the lower mold surface 76. The forming mandrel 78 is substantially the same size the cross section of the winding tool 18. A heating element 80 is disposed within the lower die plate 72. The heating element 80 is configured to heat the lower mold surface 76. In the example provided, the heating element 80 includes electrical wires that heat the lower mold surface 76 via resistance heating. Alternatively, the heating element 80 may include hot oil pumped through tubes (not shown), inductive heaters, external heaters, etc. The upper die plate 70 and/or the forming mandrel 78 may also include a heating element (not shown) without departing from the scope of the present disclosure.

Figure 13:
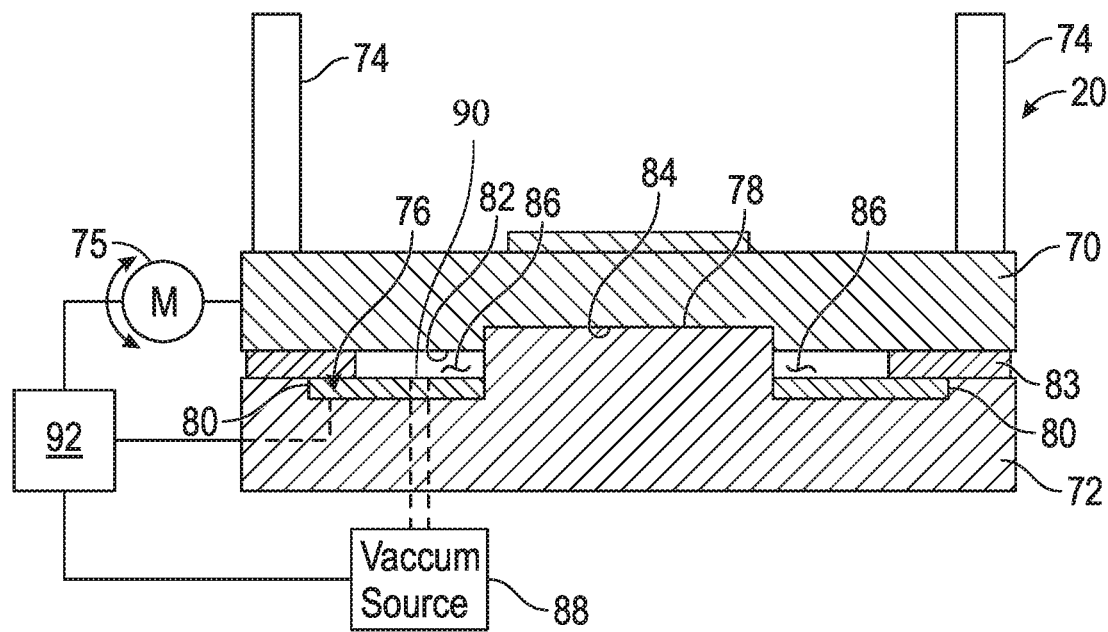
FIG. 13 is a cross-section view of the forming machine in a closed position viewed in the direction of section line 13-13 in FIG. 12, according to an exemplary embodiment.

FIG. 13 shows a cross-section of the forming machine 20 in the closed position with the upper die plate 70 mated with the lower die plate 72. The upper die plate 70 includes an upper mold surface 82. An outer mold surface 83 extends down from the upper mold surface 82. A recess 84 is formed in the upper mold surface 82. When in the closed position, the forming mandrel 78 of the lower die plate 72 is mated within the recess 84 of the upper die plate 70. Additionally, the lower mold surface 76, the forming mandrel 78, the upper mold surface 82, and the outer mold surface 83 cooperate to define a mold cavity 86 between the upper die plate 70 and the lower die plate 72. The mold cavity 86 surrounds the forming mandrel 78.

In one embodiment, the forming machine 20 further includes a vacuum source 88 that communicates with a vacuum port 90. The vacuum port 90 is disposed in the lower mold surface 76 and communicates with the mold cavity 86. The vacuum source 88 generates a vacuum in the mold cavity 86 to removes excess air, gases and voids from wound tubular braiding 24 during forming. The vacuum port 90 may alternatively, or in addition, be disposed in the upper mold surface 82.

The forming machine 20 further includes a controller 92 in communication with the electric motor 75, the heating element 80, and the vacuum source 88. The controller 92 may also be in communication with the device 65 used to wind the tubular braiding 22 around the winding tool 18 (see FIG. 10). The controller 92 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controller 92 may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The controller 92 controls movement of the upper die plate 70 and the lower die plate 72 via the electric motor 75. The controller 92 also controls the temperature that is applied to the mold cavity 86 during forming of the wound tubular braiding 24 into the composite structure 26 via the heating element 80. In one example, the controller 92 controls the temperature in the mold cavity 86 based on the type of resin used in the unidirectional tape 32 (FIG. 4) that makes up the wound tubular braiding 24. In one embodiment the thermoplastic resin includes a resin melt temperature that ranges from about 205° C. to over 400° C., and a thermoset resin includes a resin melt temperature of about 177° C. As used herein, the term "about" is known to those skilled in the art. Alternatively, the term "about" means +/−10° C. The controller 92 also controls the rate at which the mold cavity 86 is cooled to ensure cross-linking of the thermoset polymer in the unidirectional tape 32. The controller 92 also controls applying a vacuum to the mold cavity 86 via the vacuum source 88. As noted above, the vacuum removes excess air, gas, volatiles, and voids from the wound tubular braiding 24 in the mold cavity 86. In one embodiment, the controller 92 also controls resin infusion (not shown) of the wound tubular braiding 24 during forming. Resin infusion may be desirable where the unidirectional tape 32 employs a thermoset resin and where the unidirectional fibers 54 are tacked together with a binder into tows or tapes. The tacking provides enough binder to hold non-impregnated fibers together in tows of tape. The resin infusion impregnates the unidirectional fibers 54 with the resin With reference to FIGS. 14 and 15, the forming machine 20 is shown with the wound tubular braiding 24 disposed therein prior to forming. The wound tubular braiding 24 is disposed on the lower mold surface 76 and around the forming mandrel 78. Thus, the wound tubular braiding 24 maintains the helical or spiral winding when disposed within the forming machine 20.

Figure 16:
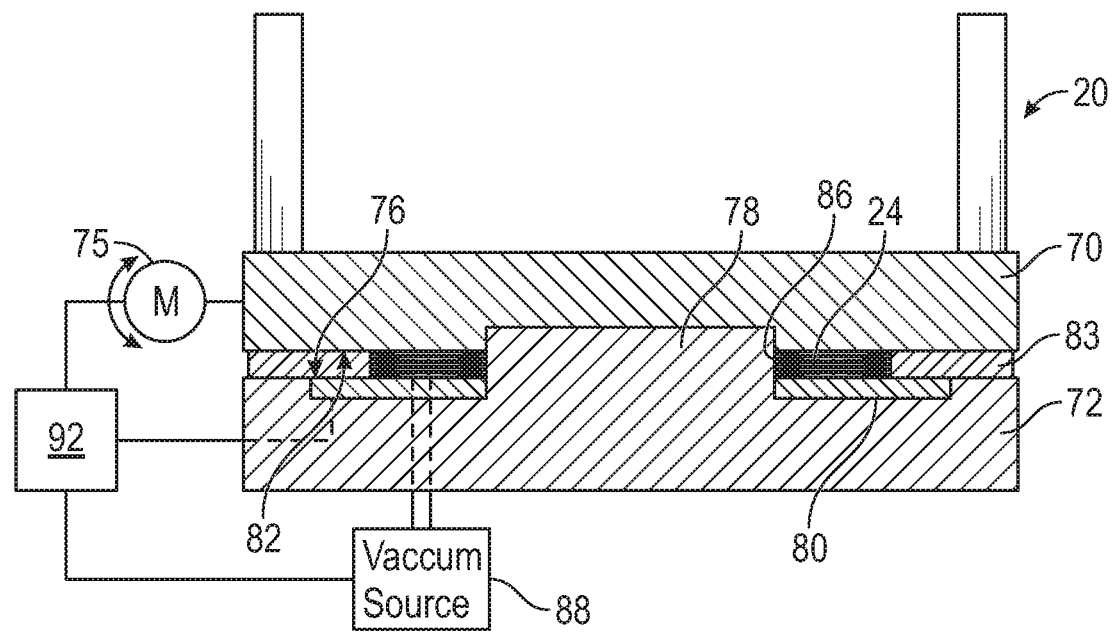
FIG. 16 is a cross-section view of the forming machine in the closed position with the wound tubular braiding loaded therein viewed in the direction of section line 16-16 in FIG. 14, according to an exemplary embodiment.

FIG. 16 shows the forming machine 20 in the closed position with the wound tubular braiding 24 disposed therein. To form the composite structure 26, the wound tubular braiding 24 is consolidated, i.e. compressed, by the upper die plate 70 and lower die plate 72 within the mold cavity 86. For example, the controller 92 executes instructions to actuate the upper die plate 70 and the lower die plate 72 towards one another via the electric motor 75 until the upper die plate 70 is pressed against the lower die plate 72. Pressing the upper die plate 70 against the lower die plate 72 consolidates the wound tubular braiding 24. Next, the controller 92 applies heat to the wound tubular braiding 24 via the heating element 80. As noted above, the temperature that is set, as well as the heating time and cooling time, is determined based on factors related to the material of the resin used in the wound tubular braiding 24. In one example, the temperature is from about 205° C. to over 400° C. and in another example the temperature is set to about 177° C. Either before or during heating, the controller 92 applies a vacuum to the mold cavity 86 via the vacuum source 88 to remove excess air, gas, volatiles, and voids from the wound tubular braiding 24 during consolidation and/or heating. Once consolidation, heating, and cool off has been accomplished, the controller 92 commands the electric motor 75 to open the forming machine 20 and the composite structure 26 is removed. The composite structure 26 may be removed manually or via a robotic arm or manipulator (not shown).

In one embodiment, the composite structure 26 is overmolded to create additional features such as, for example, connectors or ribs (not shown). The composite structure 26 may also be trimmed in order to achieve a final profile.

Figure 17:
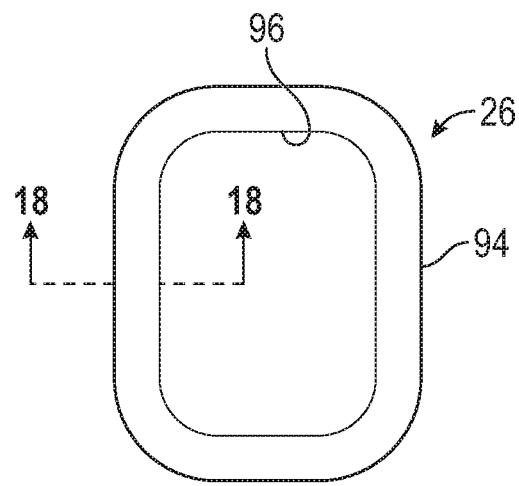
FIG. 17 is a top view of the composite structure, according to an exemplary embodiment.

FIG. 17 shows an example of the composite structure 26 formed using the braiding machine 16, winding tool 18, and forming machine 20 described above. The composite structure 26 includes a frame portion 94 that defines an aperture 96. In the example provided the composite structure 26 is illustrated as a window frame for an aircraft. However, it is to be appreciated that the composite structure 26 may be any component that defines an aperture, and especially any component that also includes tight corners or radiuses. For example, in another embodiment the composite structure 26 may be a door frame or any other type of access frame. Referring back to FIG. 16, the lower mold surface 76, the upper mold surface 82, and the forming mandrel 78 cooperate to define the shape of the frame portion 94. In particular, the shape of the aperture 96 corresponds to the shape of the forming mandrel 78, which in turn corresponds to the shape of the winding tool 18 (FIG. 9). Thus, the body portion 60 of the winding tool 18 has roughly the shape of the aperture 96 and the outer edges of the wound tubular braiding 24 (FIG. 11) form the outer perimeter of the composite structure 26. Where the tubular braiding 22 has the triaxial braid 58, the unidirectional tape 32C (FIG. 6) is disposed roughly parallel to a perimeter of the aperture 96. Returning to FIG. 17, during forming in the forming machine 20, the tubular braiding 22 (FIGS. 5 and 6) of the wound tubular braiding 24 is compacted flat when consolidated. In other words, the composite structure 26 has a solid cross-section.

Figure 18:
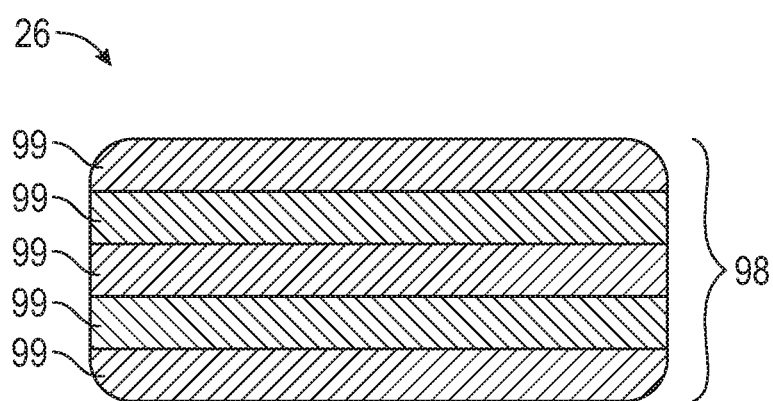
FIG. 18 is a cross-section view of the composite structure viewed in the direction of section line 18-18 in FIG. 17.

FIG. 18 shows an enlarged, cross-section of the composite structure 26 viewed in the direction of section line 18-18 in FIG. 17. The composite structure 26 has a composite laminate structure 98 that includes a plurality of plies 99. Each of the plurality of plies 99 corresponds to a stacked turn 66 (FIG. 10) of the wound tubular braiding 24. Thus, each of the plurality of plies 99 include either a flattened biaxial braid 56 (FIG. 5) or a flattened triaxial braid 58 (FIG. 6). During consolidation and heating, the resin of the unidirectional tape 32 (FIGS. 5 and 6) forms a polymer matrix such that the plurality of plies 99 are defined by orientation of the unidirectional fibers 54 (FIG. 4) that forms the unidirectional tape 32. For each of the plurality of plies 99, either the biaxial braid 56 or the triaxial braid 58 are oriented to form a hoop type configuration with a large volume of the unidirectional fibers 54 in the desire direction, thus increasing the efficiency of the composite structure 26. In other words, the unidirectional fibers 54 (FIG. 4) are oriented in the same direction for each of the plurality of plies 99 at any given cross section. The composite laminate structure 98 includes a predefined fiber to volume ratio, which may also be referred to as a fiber volume ratio. The fiber volume ratio represents the percentage of unidirectional fibers 54 in the composite laminate structure 98. Mechanical properties of a composite structure such as, but not limited to, tensile strength depend upon the fiber to volume ratio. Thus, the fiber to volume ratio of the composite laminate structure 98 is determined based on a specific application or requirements.

It is to be appreciated that the forming machine 20 consolidates the wound tubular braiding 24 into a near net shape. As a result, the composite structure 26 requires less trimming to create a final profile when compared to conventional processes. Furthermore, the extensive post-processing and machining that is typically required to fabricate a composite structure is no longer needed.

Figure 19:
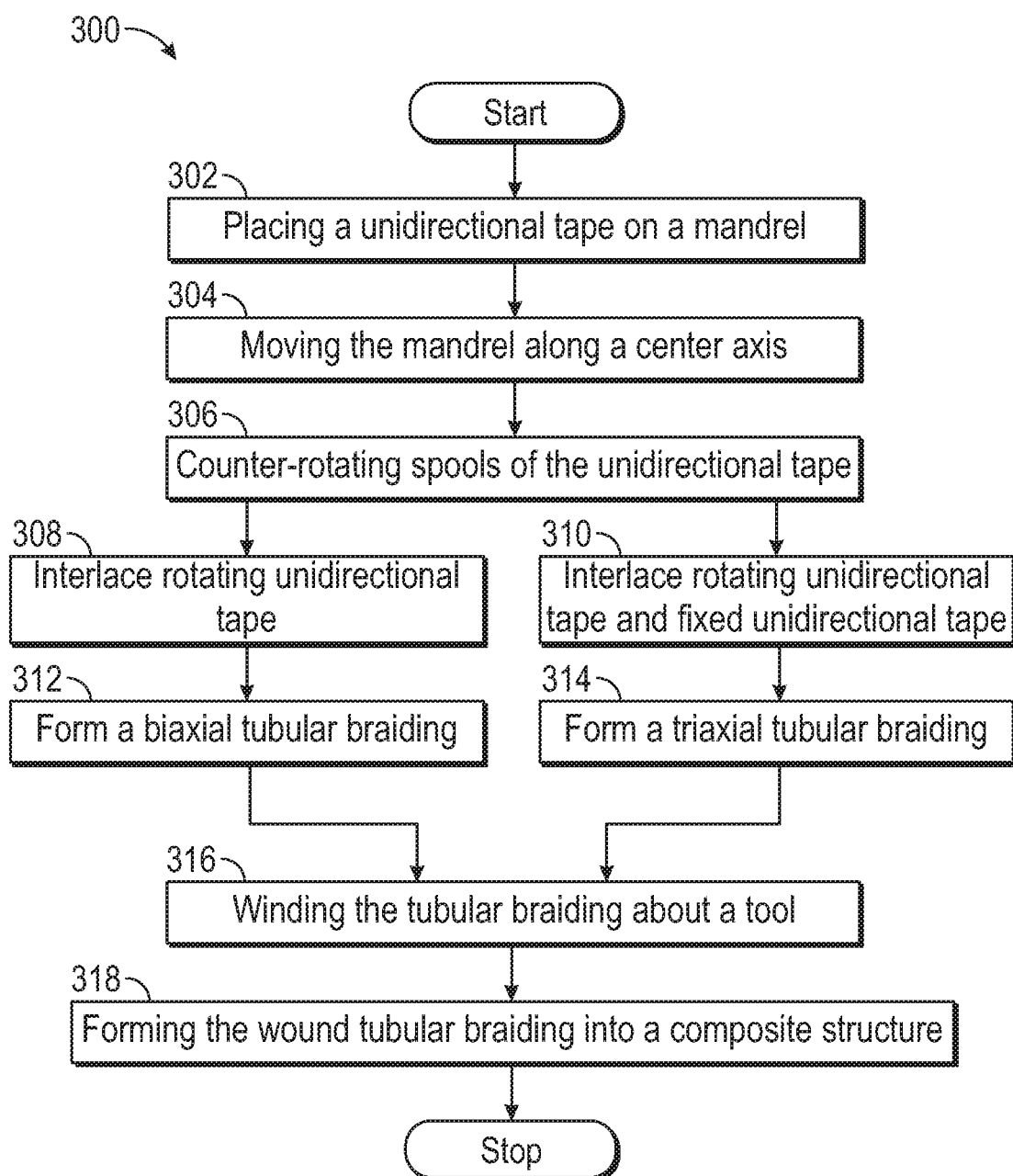
FIG. 19 is an exemplary process flow diagram illustrating a method of forming the composite structure, according to an exemplary embodiment.

Turning now to FIG. 19, an exemplary process flow diagram illustrates a method 300 for fabricating the composite structure 26 using the system 10 described above in FIGS. 1-18. The method 300 beings at block 302. In block 302, the method 300 includes placing the unidirectional tape 32 on the mandrel 30. For example, a combination of unidirectional tape 32A, 32B, or 32C may be placed on the mandrel 30. The method 300 then proceeds to block 304.

At block 304 the control module 52 commands the mandrel 30 to move axially along the center axis "A" (FIG. 2). At block 306, the control module 52 commands the warp spools 38A and the weft spools 38B to counter rotate about the center axis "A" as the mandrel 30 moves along the center axis "A". Depending on which type of braid 56, 58 (FIGS. 5, 6) is to be produced, the method 300 proceeds to either block 308 or block 310.

At block 308 the unidirectional tape 32A, 32B are interlaced together to form the biaxial braid 56 (FIG. 5). For example, as the mandrel 30 moves along the center axis "A", the warp spools 38A and the weft spools 38B counter-rotate. Movement of the mandrel 30 draws out the unidirectional tape 32 disposed on the warp spools 38A and the weft spools 38B. The counter-rotation of the warp spools 38A and the weft spools 38B interlaces the unidirectional tape 32A from the warp spools 38A with the unidirectional tape 32B from the weft spools 38B as the mandrel 30 moves along the center axis "A" (FIG. 2). At block 312 the tubular braiding 22 has been formed with a biaxial braid 56 (FIG. 5).

At block 310 the unidirectional tape 32A, 32B, and 32C are interlaced together to form the triaxial braid 58 (FIG. 6). For example, as the mandrel 30 moves along the center axis "A", the warp spools 38A and the weft spools 38B counter-rotate. Movement of the mandrel 30 draws out the unidirectional tape 32A disposed on the warp spools 38A, the unidirectional tape 32B disposed on the weft spools 32B, and the unidirectional tape 32C disposed on the fixed spools 38C. The counter-rotation of the warp spools 38A and the weft spools 38B interlaces the unidirectional tape 32A from the warp spools 38A with the unidirectional tape 32B from the weft spools 38B and with the unidirectional tape 32C from the fixed spools 38C as the mandrel 30 moves along the center axis "A" (FIG. 2). At block 314 the tubular braiding 22 has been formed with a triaxial braid 58 (FIG. 6). Depending on the configuration of the mandrel 30 as noted above, the mandrel 30 may be separated from the tubular braiding 22 or left in the tubular braiding 22. From block 312 or block 314, the method 300 proceeds to block 316.

Block 316 includes winding the tubular braiding 22 around the winding tool 18. The winding of the tubular braiding 22 forms the wound tubular braiding 24 (FIG. 11). As noted above, the winding may be done manually or via an automated process using the device 65. The method 300 then proceeds to block 318.

Figure 14:
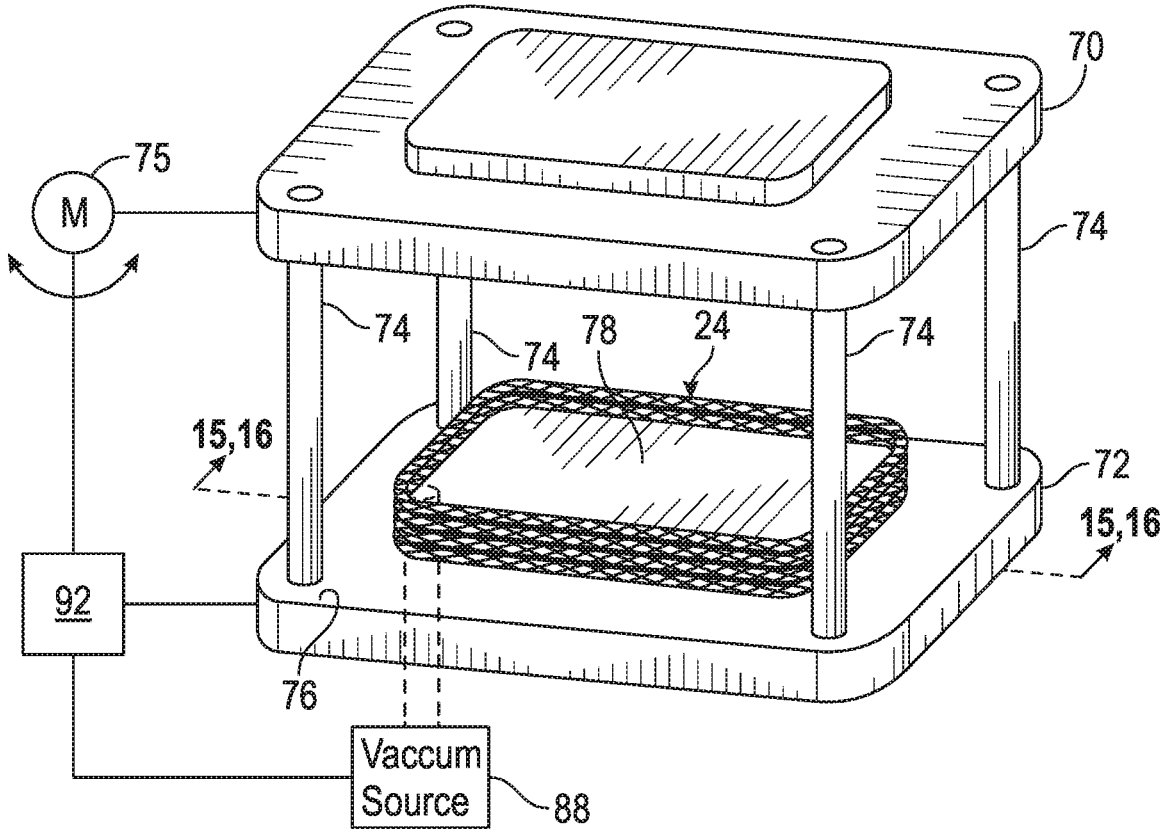
FIG. 14 is a front perspective view of the forming machine in the open position with the wound tubular braiding loaded therein, according to an exemplary embodiment.
Figure 15:
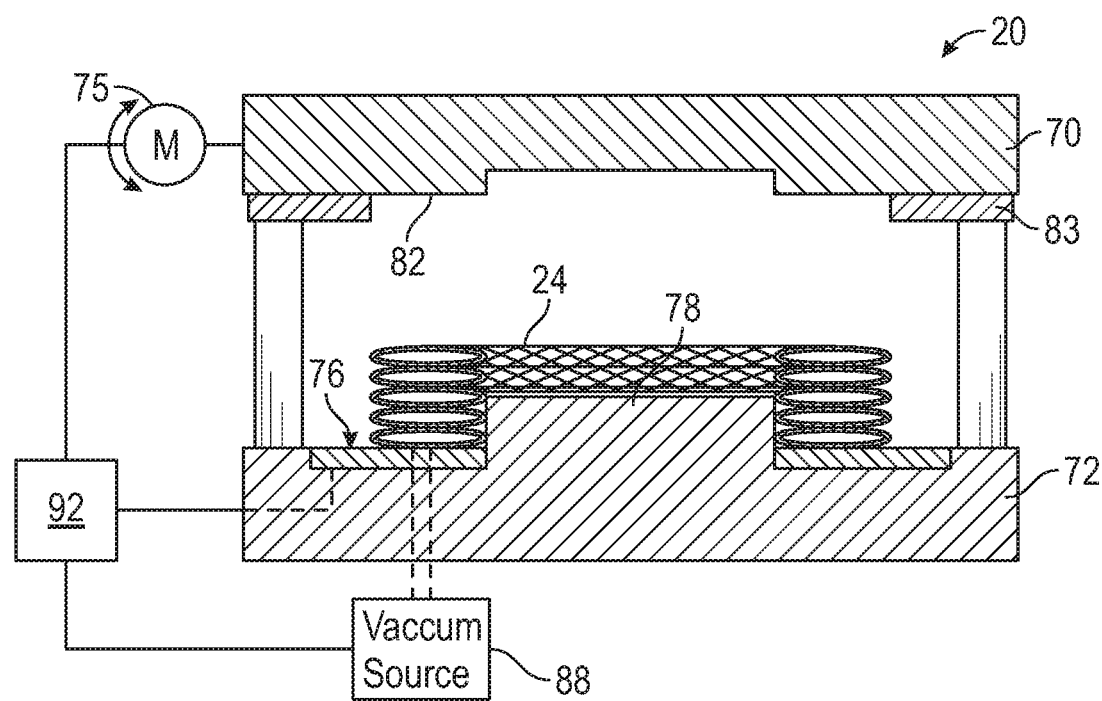
FIG. 15 is a cross-section view of the forming machine in the open position with the wound tubular braiding loaded therein viewed in the direction of section line 15-15 in FIG. 14, according to an exemplary embodiment.

Block 318 includes forming the wound tubular braiding 24 into the composite structure 26. For example, the wound tubular braiding 24 may be placed into the forming machine 20 (FIGS. 14-15). The controller 92 then consolidates, i.e. flattens, the wound tubular braiding 24 to form the plies 99 (FIG. 18). The controller 92 then heats the wound tubular braiding 24 to form the composite structure 26 (FIG. 16).

Figure 20:
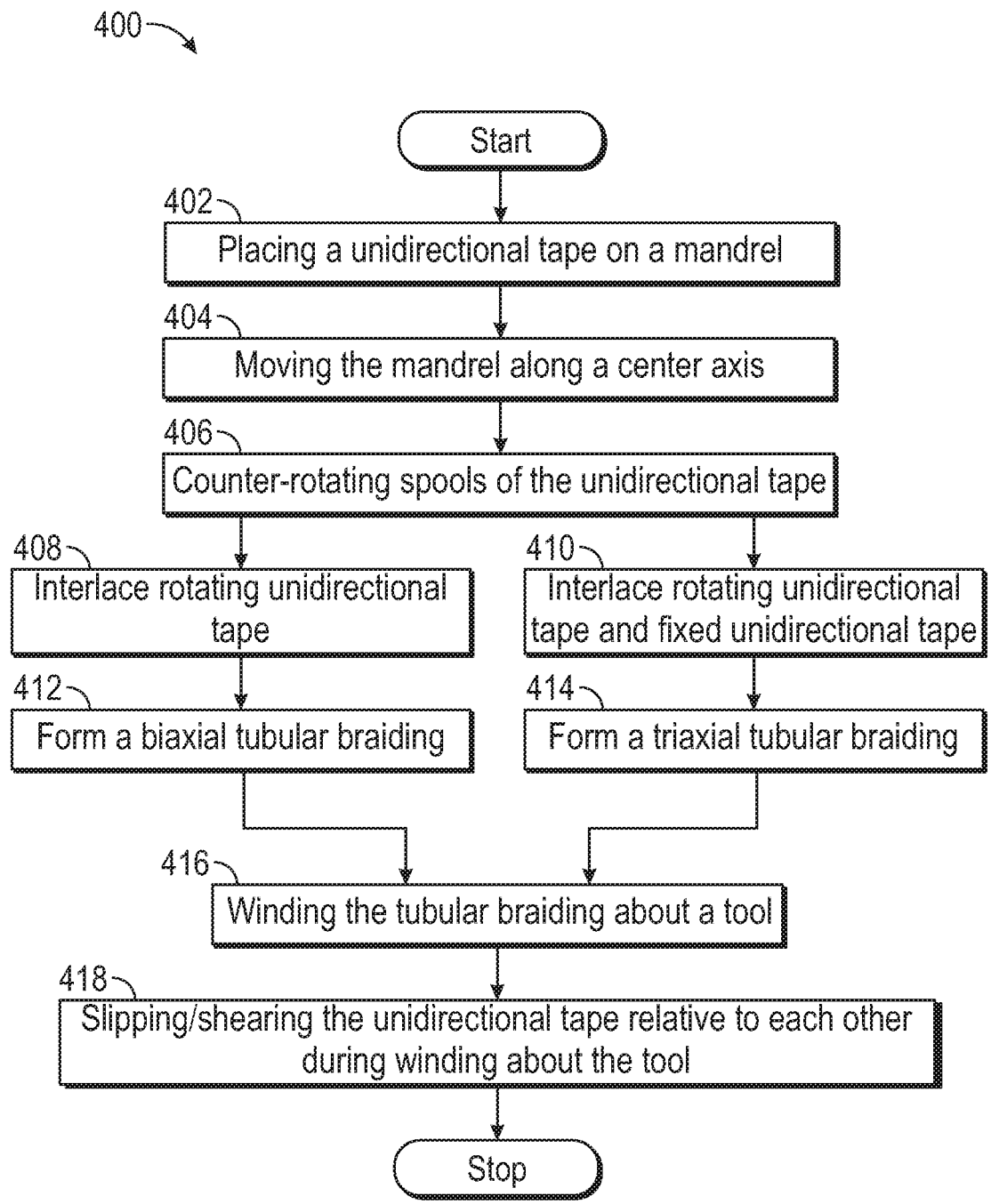
FIG. 20 is an exemplary process flow diagram illustrating a method of winding the tubular braiding, according to an exemplary embodiment.

Referring to FIG. 20, an exemplary process flow diagram illustrates a method 400 for forming the winding of tubular braiding 22 using the system 10 described above in FIGS. 1-11. The method 400 beings at block 402. In block 402, the method 400 includes placing the unidirectional tape 32 on the mandrel 30. For example, a combination of unidirectional tape 32A, 32B, or 32C may be placed on the mandrel 30. The method 400 then proceeds to block 404.

At block 404 the control module 52 commands the mandrel 30 to move axially along the center axis "A" (FIG. 2). At block 406, the control module 52 commands the warp spools 38A and the weft spools 38B to counter rotate about the center axis "A" as the mandrel 30 moves along the center axis "A". Depending on which type of braid 56, 58 (FIGS. 5, 6) is to be produced, the method 400 proceeds to either block 408 or block 410.

At block 408 the unidirectional tape 32A, 32B are interlaced together to form the biaxial braid 56 (FIG. 5). For example, as the mandrel 30 moves along the center axis "A", the warp spools 38A and the weft spools 38B counter-rotate. Movement of the mandrel 30 draws out the unidirectional tape 32 disposed on the warp spools 38A and the weft spools 38B. The counter-rotation of the warp spools 38A and the weft spools 38B interlaces the unidirectional tape 32A from the warp spools 38A with the unidirectional tape 32B from the weft spools 38B as the mandrel 30 moves along the center axis "A" (FIG. 2). At block 412 the tubular braiding 22 has been formed with a biaxial braid 56 (FIG. 5).

At block 410 the unidirectional tape 32A, 32B, and 32C are interlaced together to form the triaxial braid 58 (FIG. 6). For example, as the mandrel 30 moves along the center axis "A", the warp spools 38A and the weft spools 38B counter-rotate. Movement of the mandrel 30 draws out the unidirectional tape 32A disposed on the warp spools 38A, the unidirectional tape 32B disposed on the weft spools 32B, and the unidirectional tape 32C disposed on the fixed spools 38C. The counter-rotation of the warp spools 38A and the weft spools 38B interlaces the unidirectional tape 32A from the warp spools 38A with the unidirectional tape 32B from the weft spools 38B and with the unidirectional tape 32C from the fixed spools 38C as the mandrel 30 moves along the center axis "A" (FIG. 2). At block 414 the tubular braiding 22 has been formed with a triaxial braid 58 (FIG. 6). Depending on the configuration of the mandrel 30 as noted above, the mandrel 30 may be separated from the tubular braiding 22 or left in the tubular braiding 22. From block 412 or block 414, the method 400 proceeds to block 416. Block 416 includes winding the tubular braiding 22 around the winding tool 18. The winding of the tubular braiding 22 forms the wound tubular braiding 24 (FIG. 11). As noted above, the winding may be done manually or via an automated process using the device 65. The method 400 then proceeds to block 418.

Block 418 includes slipping or shearing the unidirectional tape 32 (FIGS. 5-6) relative to one another while winding the tubular braiding 22 around the winding tool 18. It is to be appreciated that the unidirectional tape 32 slips or shears relative to one another without bending when the tubular braiding 22 is wound around the winding tool 18. This results in a wound tubular braiding 24 having an increased number of unidirectional tape 32 oriented in the same direction as the perimeter of the composite structure 26, which in turn provides improved load bearing capabilities. The disclosed process for fabricating the composite structure 26 is faster when compared to conventional lay-up processes, thereby enabling higher production rates. Finally, the disclosed process creates less wasted material when compared to conventional processes.

Figure 21:
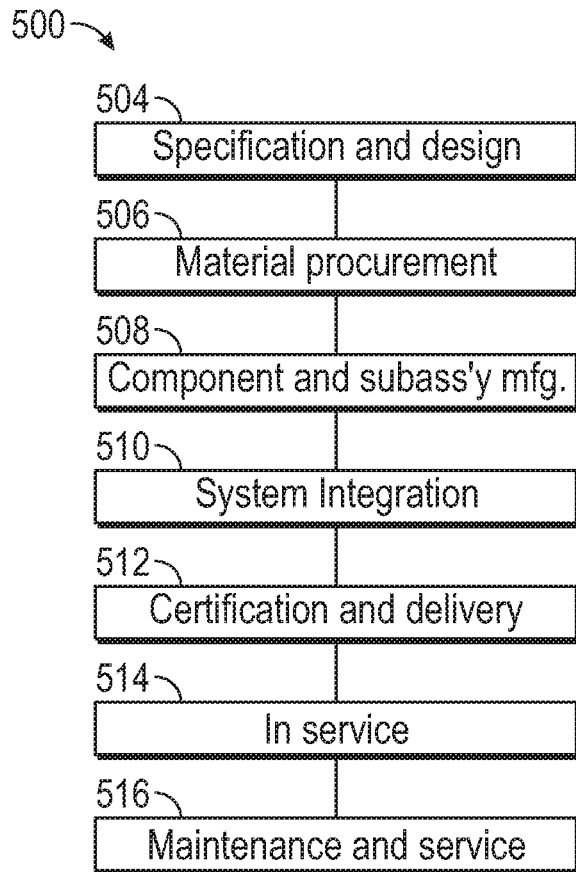
FIG. 21 is a flow diagram of aircraft production and service methodology.
Figure 22:
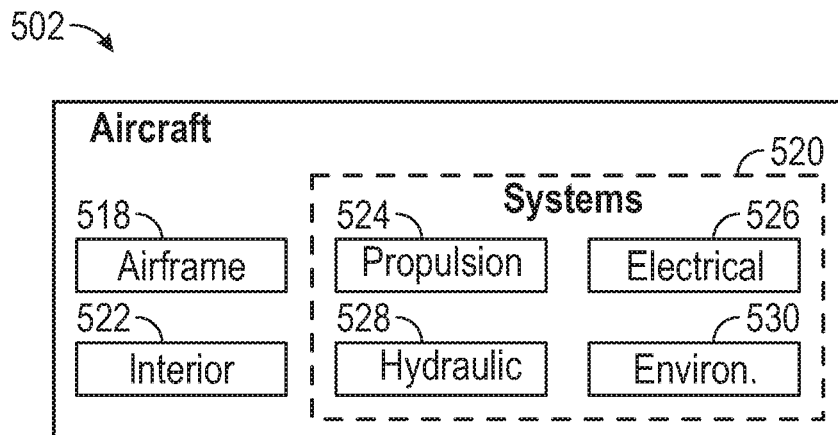
FIG. 22 is a block diagram of an aircraft.

Embodiments of the system 10 described above, as well as the methods 100, 200, 300, and 400, may be employed in the context of an aircraft manufacturing and service method 500 as shown in FIG. 21 and an aircraft 502 as shown in FIG. 22. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of the systems and methods described herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

The system and methods described above may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516. Embodiments of the system 10 described above, as well as the methods 100, 200, 300, and 400, may be employed with the component and subassembly manufacturing 508, the system integration 510, the routine maintenance and service 516, the airframe 518, and the interior 522.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An assembly for producing a composite part, the assembly comprising:
   a braiding machine having:
      a mandrel, wherein the mandrel is inflatable;
      an inflation mechanism providing air to the mandrel;
      a braiding mechanism having spools, each of the spools moveable relative to the mandrel;
      a unidirectional tape wound around each of the spools;
      a guide ring positioned around the mandrel, wherein the guide ring directs the unidirectional tape wound around a corresponding spool onto the mandrel; and
      a control module in electronic communication with the braiding mechanism and the inflation mechanism, wherein the control module executes instructions to provide air via the inflation mechanism to inflate the mandrel into a predetermined shape and to guide movement of the spools to wind the unidirectional tape around the mandrel when inflated into the predetermined shape to create a tubular braiding; and
   a winding tool having:
      a body portion with an outer surface that conforms to a shape of the composite part structure, wherein the tubular braiding is wrapped around the outer surface of the body portion to form a wound tubular braiding having a plurality of stacked turns.

2. The assembly of claim 1, wherein the unidirectional tape comprises unidirectional fibers.

3. The assembly of claim 2, wherein the unidirectional fibers are pre-impregnated with a resin.

4. The assembly of claim 1, wherein the mandrel is constructed of a semi-rigid material.

5. The assembly of claim 4, wherein the semi-rigid material is selected from the group consisting of: ethylene propylene diene monomer (EPDM), rubber, silicone, neoprene, and natural rubber.

6. The assembly of claim 1, wherein the control module executes instructions to:
   receive an indication that the unidirectional tape is wound around the mandrel; and
   in response to receiving the indication, instruct the inflation mechanism to release air to deflate the mandrel.

7. The assembly of claim 1, wherein the mandrel is constructed of a thin film polymer compatible with a composition of the tubular braiding.

8. The assembly of claim 1, wherein the wound tubular braiding has a helical shape or a spiral shape.

9. The assembly of claim 1, wherein the wound tubular braiding is hollow and defines a central bore that extends throughout the wound tubular braiding.

10. The assembly of claim 1, wherein the outer surface of the winding tool corresponds to an aperture defined by the composite part.

11. The assembly of claim 1, further comprising a forming machine for forming the wound tubular braiding into the composite part using heat, compression, and resin infusion.

12. The assembly of claim 11, wherein the forming machine includes a forming mandrel which receives the wound tubular braiding thereon and the forming mandrel corresponds to an aperture defined by the composite part.

13. The assembly of claim 1, wherein the tubular braiding has a axial, biaxial, or triaxial braid.

14. The assembly of claim 1, wherein the wound tubular braiding is formed of a single length of tubular braiding.

15. A method of fabricating a wound tubular braiding for forming a composite part, the method comprising:
   providing a braiding machine having:
      a mandrel, wherein the mandrel is inflatable;
      an inflation mechanism providing air to the mandrel;
      a braiding mechanism having spools, each of the spools moveable relative to the mandrel;
      a unidirectional tape wound around each of the spools;
      a guide ring positioned around the mandrel, wherein the guide ring directs the unidirectional tape wound around a corresponding spool onto the mandrel; and
      a control module in electronic communication with the braiding mechanism and the inflation mechanism, wherein the control module executes instructions to provide air via the inflation mechanism to inflate the mandrel into a predetermined shape and to guide movement of the spools to wind the unidirectional tape around the mandrel when inflated into the predetermined shape to create a tubular braiding; and providing a winding tool having a body portion with an outer surface that conforms to a shape of the composite part; and winding the tubular braiding of unidirectional tape onto the outer surface of the body portion to form a plurality of stacked turns while allowing the unidirectional tape to slip or shear relative to one another without bending.

16. The method of claim 15, further comprising winding the tubular braiding into a spiral pattern around the winding tool to create the wound tubular braiding.

17. The method of claim 15, wherein the outer surface of the winding tool corresponds to an aperture defined by the composite part structure.

18. The method of claim 15, wherein the tubular braiding has a biaxial braid.

19. The method of claim 15, wherein the tubular braiding has a triaxial braid.

20. The method of claim 15, further comprising fabricating the tubular braiding from a unidirectional tape.

21. The method of claim 15, further comprising fabricating the tubular braiding from a unidirectional tow.

22. An assembly for producing a composite part, the assembly comprising:
 a braiding machine having:
  a mandrel;
  a braiding mechanism having spools, each of the spools moveable relative to the mandrel;
  a unidirectional tape wound around each of the spools;
  a guide ring positioned around the mandrel, wherein the guide ring directs the unidirectional tape wound around a corresponding spool onto the mandrel; and
  a control module in electronic communication with the braiding mechanism, wherein the control module executes instructions to guide movement of the spools to place the unidirectional tape onto the mandrel to create a tubular braiding;
 a winding tool having:
  a body portion with an outer surface that conforms to a shape of the composite part, wherein the tubular braiding is wrapped around the outer surface of the body portion to form a wound tubular braiding having a plurality of stacked turns; and
 a forming machine for forming the wound tubular braiding into the composite part using heat, compression, and resin infusion.

23. The assembly of claim 22, wherein the forming machine includes a forming mandrel which receives the wound tubular braiding thereon and the forming mandrel corresponds to an aperture defined by the composite part.

24. The assembly of claim 22, wherein the tubular braiding has a axial, biaxial, or triaxial braid.

25. The assembly of claim 22, wherein the wound tubular braiding has a helical shape when wrapped around the winding tool.

26. The assembly of claim 22, wherein the wound tubular braiding has a spiral shape when wrapped around the winding tool.

27. The assembly of claim 22, wherein the mandrel is inflatable.

28. The assembly of claim 27, wherein the control module executes instructions to provide air via the inflation mechanism to inflate the mandrel into a predetermined shape and to guide movement of the spools to wind the unidirectional tape around the mandrel when inflated into the predetermined shape to create the tubular braiding.

* * * * *

UNITED STATES PATENT AND TRADEMARK OFFICE
CERTIFICATE OF CORRECTION

PATENT NO. : 11,213,995 B2
APPLICATION NO. : 16/179343
DATED : January 4, 2022
INVENTOR(S) : Amol Ogale Page 1 of 1

It is certified that error appears in the above-identified patent and that said Letters Patent is hereby corrected as shown below:

In the Claims

At Column 16, Line 11, Claim 1 reads:
"a shape of the composite part structure, wherein"
Should read:
--a shape of the composite part, wherein--

Signed and Sealed this
Eleventh Day of October, 2022

Katherine Kelly Vidal
*Director of the United States Patent and Trademark Office*